(12) United States Patent
Azzolini et al.

(10) Patent No.: US 6,311,733 B1
(45) Date of Patent: Nov. 6, 2001

(54) JUNCTION DEVICE FOR HOSES

(75) Inventors: Claudio Azzolini; Claudio Maghei, both of Colorno (IT)

(73) Assignee: Mac Tubi S.p.A., Colorno (IT)

( * ) Notice: Subject to any disclaimer, the term of this patent is extended or adjusted under 35 U.S.C. 154(b) by 0 days.

(21) Appl. No.: 09/733,765

(22) Filed: Dec. 8, 2000

(30) Foreign Application Priority Data

Feb. 4, 2000 (IT) ............................................. PR00A0009

(51) Int. Cl.[7] ....................................................... F16L 9/00
(52) U.S. Cl. ........................ 138/109; 138/125; 285/256; 285/259
(58) Field of Search ........................... 138/109, 123–126; 285/256, 259, 149, 258, 903

(56) References Cited

U.S. PATENT DOCUMENTS

| | | | |
|---|---|---|---|
| 4,106,526 | * | 8/1978 | Szentmihaly ........................... 138/109 |
| 4,142,554 | * | 3/1979 | Washkewicz et al. ............ 138/109 X |
| 4,159,027 | * | 6/1979 | Caillet ................. 138/109 X |
| 4,366,841 | * | 1/1983 | Currie et al. ......................... 138/109 |
| 5,105,854 | * | 4/1992 | Cole et al. ............................ 138/109 |
| 5,137,309 | * | 8/1992 | Beagle ................................. 285/256 |
| 5,190,323 | * | 3/1993 | Oetiker ..................................... 285/39 |
| 5,199,751 | * | 4/1993 | Beagle et al. ......................... 285/256 |
| 5,413,147 | * | 5/1995 | Moreiras et al. ..................... 138/109 |
| 5,996,637 | * | 12/1999 | Larsson ............................. 138/109 X |
| 6,155,302 | * | 12/2000 | Fischerkeller et al. .............. 138/109 |

* cited by examiner

*Primary Examiner*—Patrick Brinson
(74) *Attorney, Agent, or Firm*—Michael Best & Friedrich LLC; Charles A. Laff

(57) ABSTRACT

A junction device (1) for hoses (2) comprises an insert (3) having a portion (3a) inserted internally to an end of a hose (2) and a bushing (9) inserted externally to said end of the hose and locked to maintain the end of the hose securely inserted between the portion (3a) of said insert and the bushing. The insert comprises an annular groove (6) interposed between the portion (3a) inserted internally to the end of the hose and a portion (3b) external to said hose, whilst the bushing (9) comprises a concave annular area (10) which, when the junction device is assembled, is positioned internally to said annular groove of the insert. The insert further comprises an annular rib (7) to provide an area of interference with the concave annular area (10) of the bushing.

14 Claims, 1 Drawing Sheet

JUNCTION DEVICE FOR HOSES

BACKGROUND OF THE INVENTION

The present invention relates to a junction device for hoses. As is well known, such devices are used in plants for distributing pressurised fluids, in which it is necessary to provide for the end of the pipe to be able to be inserted easily and rapidly into an apparatus positioned downstream of the junction device itself. For this purpose junction devices are known which comprise an insert destined to be inserted into the free end of the hose and a bushing destined to be inserted externally to the hose itself.

By pinching the three elements thus assembled, the locking of the hose is obtained between the bushing and the insert. The insert comprises sealing elements, for instance O-rings, inserted in the coupling area with the apparatus to be used.

Known device can comprise both the bushing and the insert made of metallic material, but they have rather high costs.

Also known are devices in which the insert is made of plastic material, consequently decreasing costs. In addition, this type of devices has some drawbacks.

In the first place the coupling of the bushing and the insert is stabilised only by means of the final clinching phase. In the second place, to guarantee the seal and prevent the pipe from being extracted, the clinching operation is performed with shaped clamps, expressly made, which crush the insert, deforming it, with the risk of limiting its sealing ability.

SUMMARY OF THE INVENTION

The aim of the present invention is to eliminate the aforesaid drawbacks by making available a junction device which allows a correct positioning between bushing and insert and a proper centring during the clinching phase. A further aim of the present invention is to standardise the dimensions of the bushing and prevent possible deformations of the insert during the manufacturing phase.

Yet another aim is to obtain a proper centring between the hose and locking elements with the downstream apparatus, to avoid off-axis conditions and incorrect positioning of the sealing elements.

Said aims are fully achieved by the junction device for hoses of the present invention, which is characterised by the contents of the claims set out below and specifically in that it comprises an insert provided with an annular groove and a bushing provided with a concave annular area which, when the junction device is assembled, is positioned internally to said annular groove of the insert.

BRIEF DESCRIPTION OF THE DRAWINGS

This and other features will become more readily apparent from the description that follows of a preferred embodiment illustrated, purely by way of non limiting example, in the accompanying drawing tables, in which.

DESCRIPTION OF THE PREFERRED EMBODIMENTS

Figure 1:
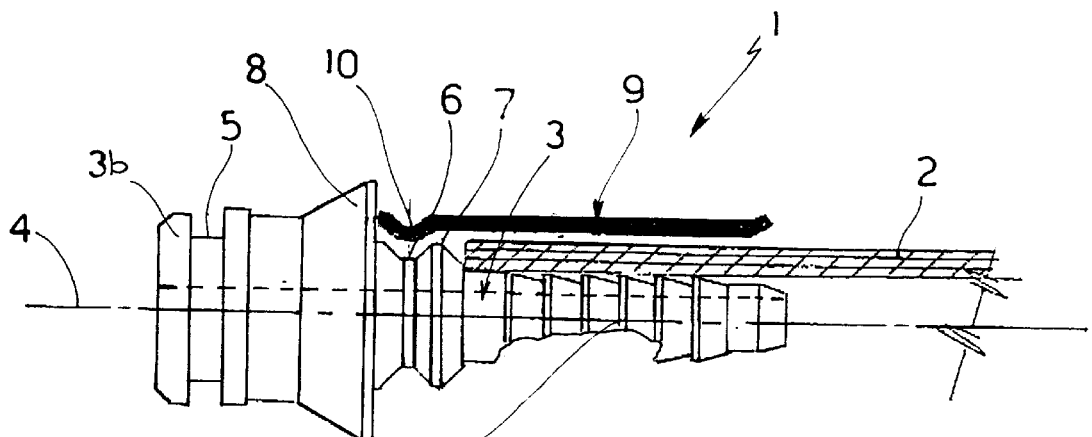
FIGS. 1 and 2 show a lateral section view of a junction device according to the present invention, respectively in two assembly phases.

With reference to the figures, the reference number 1 indicates a junction device for hoses 2, able to connect the hose with an apparatus, not shown in the figure.

The aforesaid junction device comprises an insert 3 made of plastic material, destined to be inserted inside the hose 2 at least for a portion indicated as 3a.

This portion presents a toothed surface and the shape of the teeth is such as to prevent a possible extraction of the hose relative to the insert.

The insert 3 presents a substantially symmetrical shape relative to a longitudinal axis 4, obtained by rotation of the profile shown about the longitudinal axis.

In addition to the toothed portion 3a and at the opposite site relative thereto, the insert 3 comprises a portion 3b that is external relative to the hose 2 and destined to interact with the apparatus downstream of the hose, not shown herein. For this purpose the external portion 3b comprises a housing 5 for an O-ring, not shown and destined to maintain the seal between the device 1 and the successive apparatus.

The insert 3 is hollow to allow flow continuity from the hose 2 to the successive apparatus.

The lateral surface of the insert 3 originally comprises an annular groove 6 interposed between the portion 3a inserted inside the end of the hose and the portion 3b external to the hose. Preferably, the groove has a "V" profile, as shown in the figure.

In addition to the annular groove 6, an annular rib 7 is also advantageously provided, interposed between the portion 3a inserted inside the end of the hose and the annular groove 6. Said rib represents an increase in the mean diameter of the insert 3 relative to the toothed portion 3a and to the annular groove 6. In particular, the annular rib 7 has a triangular profile and provides a stop for the insertion of the insert 3 inside the hose 2. The latter is positioned against the walls of the annular rib 7.

The insert 3 also comprises a reinforcement area 8 interposed between the annular groove 6 and the portion 3b external to the hose 2. As illustrated in the figure, the reinforcement area has a cone frustum development providing connection between the annular groove 6 and the external portion 3b.

The junction device 1 further comprises a bushing 9 inserted externally to the end of the hose 2 into which the insert 3 is inserted.

The bushing is made of metallic material in order to be clinched around the hose 2 and to the insert 3 and locked to maintain the end of the hose securely inserted between the portion 3a of the insert and the bushing itself.

The bushing 9 originally comprises a concave annular area 10 which, when the junction device is assembled is positioned internally to the annular groove 6 of the insert 3, to increase the resistance of the hose to traction and extraction.

When the bushing is inserted externally to the hose and to the insert, the annular rib 7 provides an area of interference with the concave annular area 10 of the bushing, whilst the reinforcement area 8 provides a stop for the end of the bushing 9.

In this way, the proper positioning of the bushing on the insert is guaranteed, along with an immediate self-centring of bushing and insert during the clinching phase and a better seal of the junction device 1.

In addition to the above description, the junction device 1 can advantageously comprise a locking ring 11 inserted externally to the bushing 9 and interacting with the reinforcement area 8. Said locking ring has the purpose of connecting the hose 2 with the apparatus positioned downstream of the junction device.

As shown in the figure, the locking ring 11 can advantageously comprise a housing 12 in which the reinforcement area 8 is positioned, thereby obtaining a self-centring of the junction device relative to the locking ring.

Figure 2:
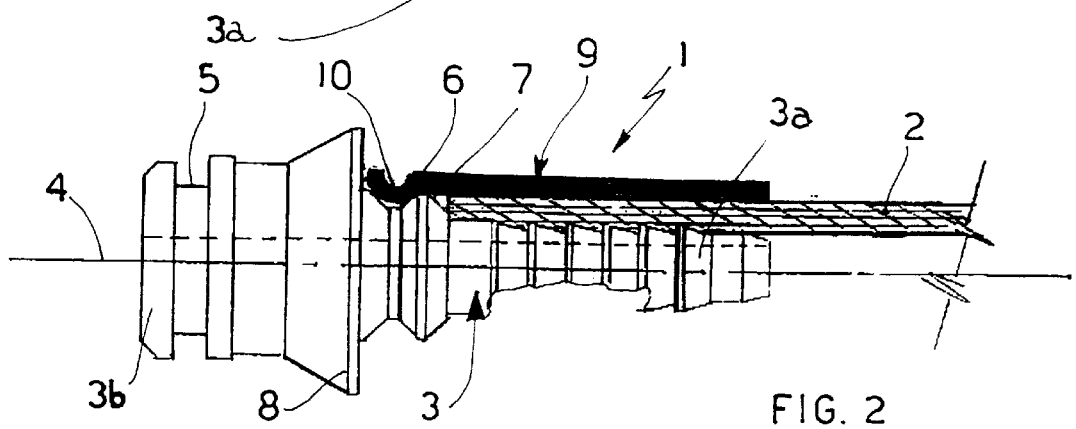
Figure 3:
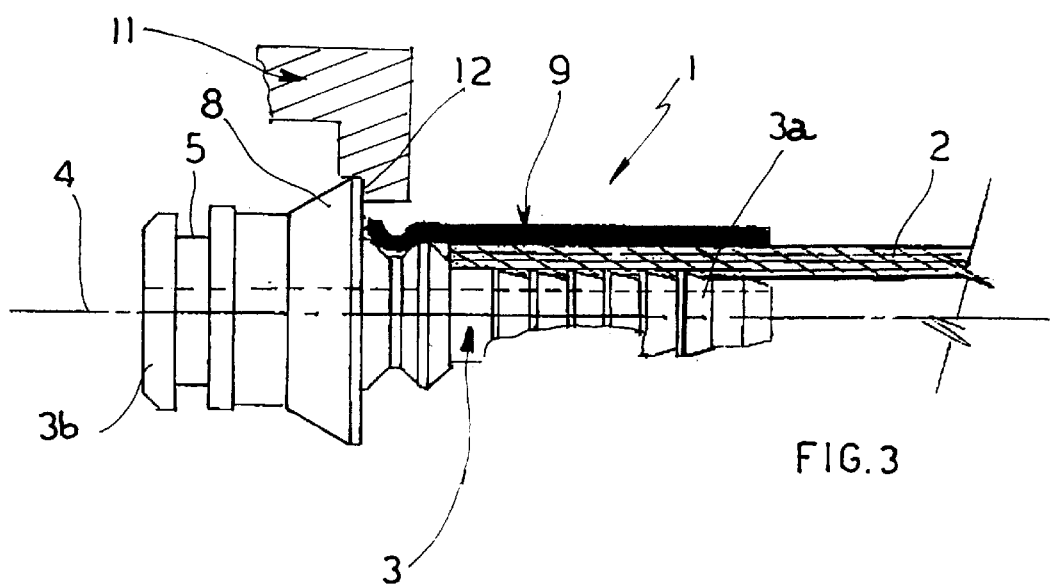
FIG. 3 shows a lateral section view of the device of FIG. 1 according to a possible use.

FIGS. 1 and 2 show the positioning to the elements of the device before and after the clinching operation, the first phase provides for the positioning of the bushing in such a way that the concave annular area 10 is positioned beyond the rib 7, in correspondence with the annular groove 6. Subsequently the concave annular area 10 is inserted inside the annular groove 6 obtaining the resistance against extraction of the junction device 1, whilst the remaining portion of the bushing tightens the hose around the internal portion 3a of the insert 3.

The junction device according to the present invention has some important advantages. In particular, the assembly between the bushing and the insert takes place securely even before the actual clinching thanks to the presence of the annular rib and of the annular concave area which obtain a restrained joint between the two elements. Consequently, the mutual self-centring between the insert and the bushing is obtained, which improves the mutual grip and thus the seal of the junction device itself. The coupling of the concave annular area and of the annular groove allows a perfect resistance against extraction of the hose.

Moreover, the simplicity of the geometry of the bushing allows to use linear lamps and practically standardised bushings even with varying types of inserts.

To the above should be added the fact that thanks to the substantially linear profile of the bushing in proximity to the internal portion of the insert, the latter undergoes no deformations and hence guarantees a better seal.

The presence of the reinforcement area and in particular the interaction of the latter with the locking ring allows a rapid assembly with the apparatus downstream of the junction device. Moreover the coupling of the locking ring with the reinforcement area is considerably improved by the presence of the housing which effects the self-centring and prevents any displacements of the hose from influencing the position of the O-ring and hence the seal.

What is claimed is:

1. A junction device for hoses, of the type comprising:
   an insert having a portion inserted internally to an end of a hose; and
   a bushing applied externally to said end of the hose and locked to maintain the end of the hose securely inserted between the portion of said insert and the bushing, wherein said insert has an annular groove interposed between the portion inserted internally to the end of the hose and a portion external to said hose, and said bushing has a concave annular area which, when the junction device is assembled, is positioned internally to the annular groove of the insert.

2. A junction device as claimed in claim 1, wherein said insert has an annular rib interposed between the portion inserted internally to the end of the hose and said annular groove to provide an area of interference with said concave annular area of the bushing, said rib further providing a stop for the insertion of the insert into the hose.

3. A junction device as claimed in claim 1, wherein said insert has a reinforcement area interposed between the annular groove and the portion external to said hose to strengthen the insert and provide a stop for said bushing.

4. A junction device as claimed in claim 3, wherein the junction device has a locking ring inserted externally to said bushing and interacting with said reinforcement area to connect said hose with an apparatus positioned downstream of said junction device.

5. A junction device as claimed in claim 4, wherein said locking ring has a housing for said reinforcement area to effect a self-centering of the junction device relative to the locking ring.

6. A device as claimed in claim 1 wherein said insert is made of plastic material.

7. A junction device as claimed in claim 2, wherein the annular rib has a triangular profile.

8. A junction device as claimed in claim 3, wherein the reinforcement area has a frustum shape.

9. A junction device as claimed in claim 1, wherein the annular groove has a V-shaped cross section.

10. A junction device as claimed in claim 1, wherein the bushing is made of metal.

11. A junction device for hoses, the junction device comprising:
    an insert having a portion adapted to fit within an end of the hose and a portion external to the hose with an annular groove formed on the insert between the insert portion internal to the hose and the insert portion external to the hose; and
    a bushing adapted to be applied to the outside of the hose end to secure the end of the hose between the insert and the bushing, the bushing having an annular projection with a pair of converging side walls which are adapted to fit within the annular groove on the insert.

12. A junction device as claimed in claim 11, wherein the annular groove on the insert has a pair of side walls which are shaped complementary to the side walls of the projection.

13. A junction device as claimed in claim 11, wherein the annular groove on the insert has a V-shaped cross section.

14. A junction device as claimed in claim 11, wherein the projection has a rounded shape.

* * * * *